US009705984B2

(12) United States Patent
Fleischmann et al.

(10) Patent No.: US 9,705,984 B2
(45) Date of Patent: Jul. 11, 2017

(54) SYSTEM AND METHOD FOR SHARING DATA STORAGE DEVICES

(71) Applicant: Datera, Incorporated, Mountain View, CA (US)

(72) Inventors: Marc Fleischmann, Palo Alto, CA (US); Claudio Fleiner, San Jose, CA (US); Michael Kromer, Konigsbrunn (DE); Nicholas Bellinger, Mountain View, CA (US)

(73) Assignee: DATERA, INCORPORATED, Mountain View, CA (US)

( * ) Notice: Subject to any disclaimer, the term of this patent is extended or adjusted under 35 U.S.C. 154(b) by 126 days.

(21) Appl. No.: 14/074,599

(22) Filed: Nov. 7, 2013

(65) Prior Publication Data
US 2014/0250322 A1   Sep. 4, 2014

Related U.S. Application Data

(60) Provisional application No. 61/772,418, filed on Mar. 4, 2013.

(51) Int. Cl.
G06F 11/00 (2006.01)
H04L 29/08 (2006.01)
G06F 12/02 (2006.01)
G06F 11/10 (2006.01)
G06F 11/16 (2006.01)

(52) U.S. Cl.
CPC ...... H04L 67/1097 (2013.01); G06F 11/1076 (2013.01); G06F 11/16 (2013.01); G06F 12/0246 (2013.01); G06F 2211/1028 (2013.01)

(58) Field of Classification Search
CPC ............ G06F 11/1088; G06F 11/1076; G06F 2211/1028; G06F 12/0246; G06F 11/16; H04L 67/1097
USPC .................... 714/13, 6.22; 711/103; 709/214
See application file for complete search history.

(56) References Cited

U.S. PATENT DOCUMENTS 5,386,535 A * 1/1995 Carteau ................. G06F 3/0601
711/112
6,237,108 B1 * 5/2001 Ogawa ................ G06F 11/1666
714/6.32
7,111,189 B1 * 9/2006 Sicola et al. ................. 714/6.21
(Continued)

FOREIGN PATENT DOCUMENTS

JP     2008027310    *  2/2008

OTHER PUBLICATIONS

Wikipedia "Blade Server" pages from date Feb. 25, 2013, retrieved using the WayBackMachine from https://web.archive.org/web/20120225111442/http://en.wikipedia.org/wiki/Blade_server.*

Primary Examiner — Yair Leibovich

(57) ABSTRACT

A fault-tolerant configuration to share computer accessible data storage devices contained in a computer system with other such computer systems. Embodiments of the present invention allow sharing data storage devices contained in a first computer storage system with a second computer system by providing two or more independent connections to the data storage devices, such connections to the second computer system being independent of a motherboard (or a component thereon) contained in the first computer system, and thus ensuring continued access to the storage devices in the presence of component failures of the first computer system, such components being redundant.

19 Claims, 9 Drawing Sheets

(56) References Cited

U.S. PATENT DOCUMENTS

| | | | | |
|---|---|---|---|---|
| 2003/0149750 A1* | 8/2003 | Franzenburg | ................ | 709/220 |
| 2003/0200398 A1* | 10/2003 | Harris | ........................ | 711/152 |
| 2009/0276613 A1* | 11/2009 | Huang | ................ | G06F 15/7803 |
| | | | | 713/2 |
| 2012/0246491 A1* | 9/2012 | Dain | ...................... | G06F 1/263 |
| | | | | 713/300 |

* cited by examiner

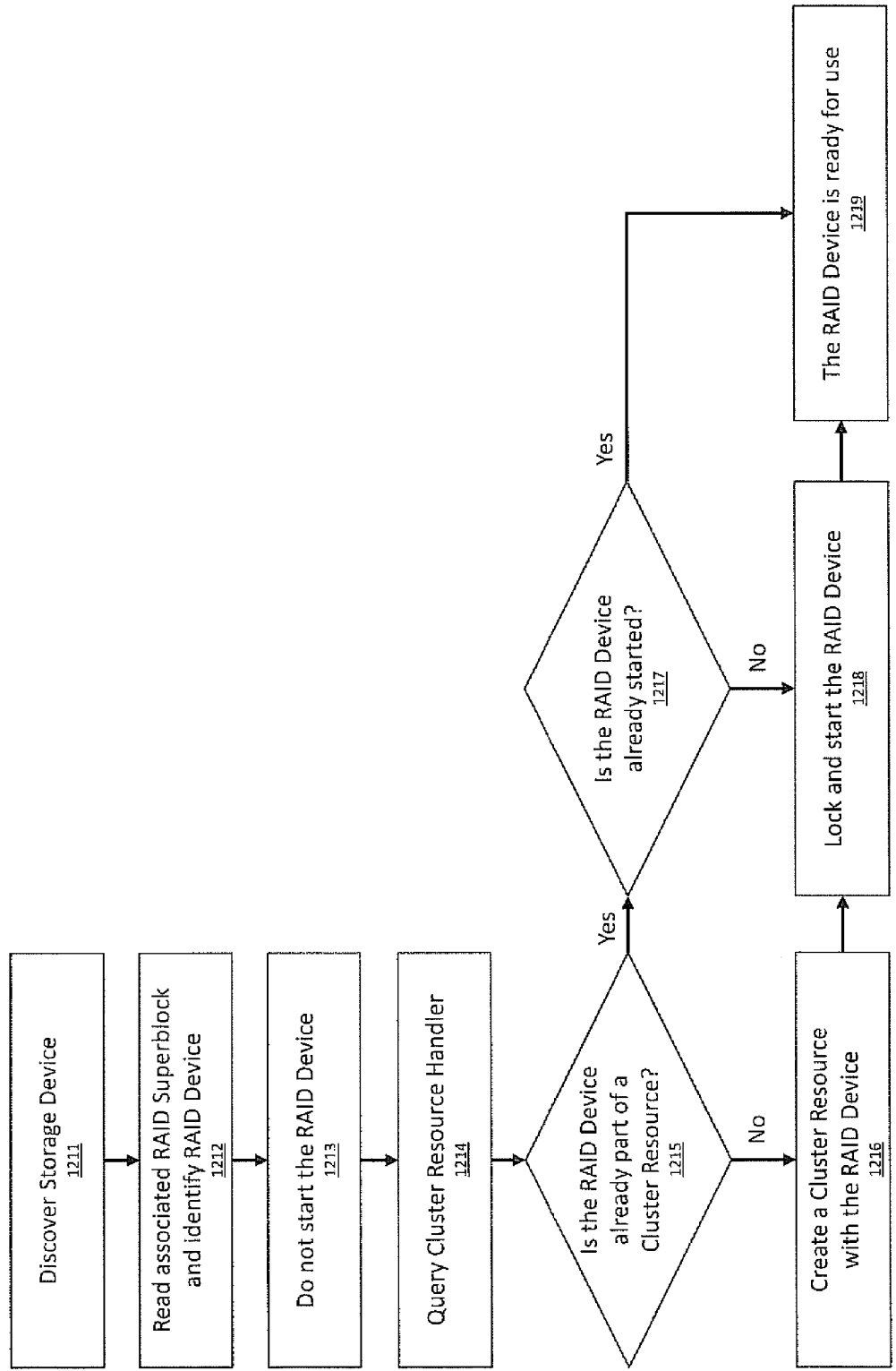

SYSTEM AND METHOD FOR SHARING DATA STORAGE DEVICES

CLAIM OF PRIORITY

The present patent application hereby claims priority to provisional patent application Ser. No. 61/772,418, filed on Mar. 4, 2013, entitled "System and Method for Sharing Data Storage Devices," by Fleischmann M., which application is also hereby incorporated by reference in its entirety.

FIELD OF THE INVENTION

Embodiments of the present invention are generally related to redundant digital computer systems and redundant digital data storage systems.

BACKGROUND OF THE INVENTION

As technology advances, data storage is becoming increasingly important and data storage capacities are increasing rapidly. Correspondingly, the size of data storage arrays and their demands for storage have increased rapidly. As a result, increasingly complex data storage systems are used to satisfy the demands for secure data storage and retrieval.

In order to ensure the ability to keep operating after a component failure, all data in a computer system may need to remain accessible. Traditionally, the approach to ensure data availability in the presence of component failures has been to separate data storage from data processing, construct data storage system without single points of failure, and share such data storage systems among the data processing systems. Separating data storage from data processing has a number of drawbacks, however, including increased overall system complexity, duplicate and thus more complicated planning and management, and generally lower overall system flexibility, agility, density, scalability and efficiency. Integrating data storage with data processing eliminates such artificial system boundaries and their drawbacks, but traditionally renders the data storage devices inaccessible upon failure of associated processing components.

Thus, a need exists to share data storage devices contained in a computer system with one or more other computer systems, and keep such data storage devices accessible upon a failure of a component in the computer systems.

A typical prior art approach (often named "Network RAID") uses multiple computer systems that contain data storage devices. In order to not lose access to data when such a computer system or a component thereof fails, the data is replicated on multiple such computer systems using either traditional RAID encoding schemes, erasure codes or similar encoding schemes, such that the data can be reconstructed even if one or more of the computer systems fail. In such a setup, the data is sent from one computer system to another over traditional computer networks by the CPU on a motherboard contained in the computer system. In such a configuration, each computer system can only access the storage devices contained in itself.

SUMMARY OF THE INVENTION

Embodiments of the present invention provide a system and method for providing fault-tolerant access to data storage devices.

Embodiments of the present invention allow sharing data storage devices contained in a first computer storage system with a second computer system by providing two or more independent connections to the data storage devices, such connections to the second computer system being independent of a motherboard (or a component thereon) contained in the first computer system, and thus ensuring continued access to the storage devices in the presence of component failures of the first computer system, such components being redundant.

One embodiment provides a first, internal connection to data storage devices contained in a first computer system, and a second, external connection to data storage devices to a second computer system, independent of a motherboard (or a component thereon) contained in the first computer system, thus providing shared access to those data storage devices for both computer systems.

A second embodiment provides shared access to each storage device for two or more processing systems contained in the same chassis, thus forming an overall single combined redundant storage and processing system.

The computer systems may need to ensure mutually exclusive access to shared data, in order to ensure data integrity. Embodiments of the present invention can provide exclusive data access at different granularities.

One or more failures of the data storage devices can be tolerated by spreading the data across multiple ones of them. This is typically accomplished by logically arranging the data storage devices into various forms of "redundant arrays of independent disks" (RAID) systems, but this invention is by no means limited to using only RAID type data redundancy.

In one embodiment, each computer system may contain one or more such shared RAID sets. In a second embodiment, the RAID sets themselves may be spread across two or more such computer systems.

In a third embodiment, the data may be redundantly dispersed among the computer systems by expressing it in over-defined polynomial equations, such as erasure codes. Such encodings may also be used to absorb a certain degree of lost data packets or network traffic.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 9 shows a flow diagram illustrating a mechanism for providing mutually exclusive access to a RAID device or a storage device.

DETAILED DESCRIPTION OF THE INVENTION

Figure 1:
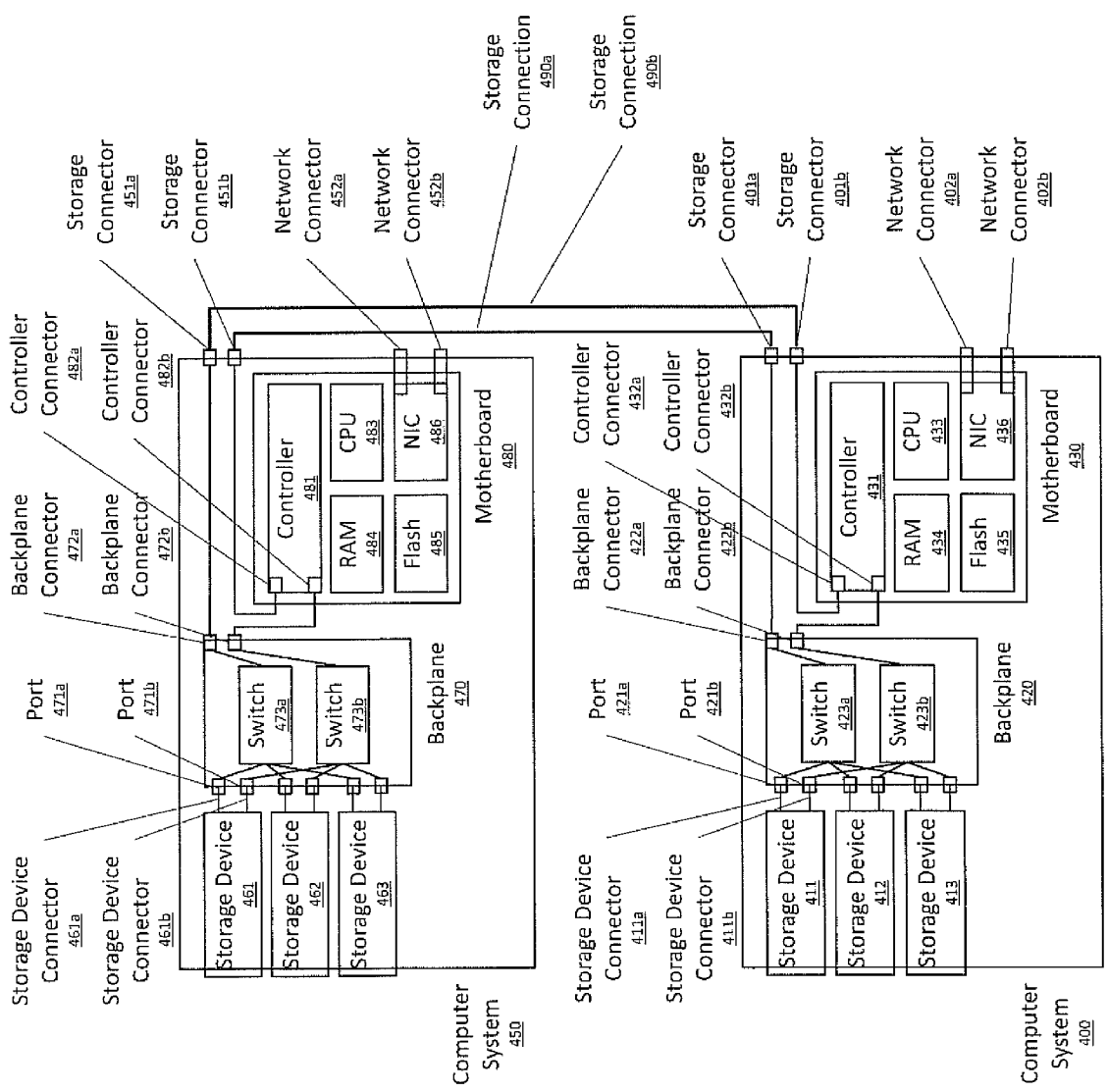
FIG. 1 shows a block diagram of two exemplary computer systems that share their storage devices over direct storage connections.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of logic blocks, procedures, processing, and other symbolic representations of functions and operations on data bits within a computer memory. These descriptions and representations are the means used by those skilled in the data processing arts to most effectively convey the substance of their work to others skilled in the art. In the present application, a logic block, a procedure, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "determining," "distributing," "flushing," "sending," "sharing," "responding," "generating," "making," "blocking," "accessing," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Exemplary Systems and Methods for Sharing Data Storage Devices Among Computer Systems FIG. 1 shows a block diagram of two exemplary computer systems 400 and 450 sharing their storage devices 411 to 413 and 461 to 463, respectively, with each other. It is appreciated that the components in computer systems 400 and 450 may operate with other components than those presented, and that, for example, not all of the components of backplanes 420 and 470, or motherboards 430 and 480 may be required to achieve the goals of the overall configuration.

A computer system 400 may include, but is not limited to, servers, desktop computers, laptops, tablet PCs, mobile devices, and smartphones. A computer system 400 typically includes a CPU 433 and a computer readable storage medium. Depending on the exact configuration and type of the computer system, the computer readable storage medium may be volatile (such as RAM), or non-volatile (such as ROM, flash memory, etc.), or some combination thereof. The volatile storage medium is illustrated by RAM 434, and the non-volatile storage medium is illustrated by flash 435.

The flash 435 can be any number, form or combination of non-volatile data storage devices, including battery-backed RAM, flash memory, phase change memory (PCM), hybrid solid state memory devices, a combination thereof, or other such non-volatile data storage devices.

Computer system 400 may have additional features or functionality. For example, computer system 400 may include additional storage devices 411, 412 and 413 (removable and/or non-removable), which are all examples of computer storage media, including, but not limited to, magnetic or optical disks or tape. The storage media include volatile and nonvolatile, removable and non-removable media implemented in any method or technology for storage of information such as computer readable instructions, data structures, program modules or other data. Storage media includes, but is not limited to, RAM, ROM, EEPROM, flash memory or other memory technology, hard disk drives (HDDs), solid storage devices (SSDs), independently powered volatile data storage including battery backed-up RAM, hybrid storage devices, CD-ROM, digital versatile disks (DVD) or other optical storage, magnetic cassettes, magnetic tape, magnetic disk storage, other magnetic storage media, or a combination thereof, or any other medium which can be used to store the desired information and which can be accessed by computing system environment 400. Any such storage device may be part of computing system environment 400.

In computer system 400, the storage devices 411 to 413 are connected to the backplane 420 via two connectors on each storage device. For instance, storage device 411 is connected through its connectors 411a and 411b to two ports 421a and 421b to the backplane 420.

The backplane 420 contains two switches 423 that provide two connections 422a and 422b to the storage devices 411 to 413.

Connection 422a provides external access to the storage devices from outside of the computer system 400 via an external connector 401a.

Connection 422b connects the storage devices to an internal storage device controller 431 that resides on a motherboard 430, which may contain other typical components of a computer system, including a central processing unit (CPUs) 433, volatile storage devices such as random access memory (RAM) 434, non-volatile storage devices, such as flash memory 435 or other such non-volatile memory technologies, and a network interface (NIC) 436.

A network interface connection (NIC) 436 allows the computer system to communicate with other devices via a network connector 402. NIC 436 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A second computer system 450 mirrors the configuration of the first computer system 300.

Thus, the first computer system 400 can access the storage devices 461 to 463 contained in the second computer system 450 just like its own storage devices, and vice versa. Thus both computer systems share their storage devices.

Thus, one of each motherboards 430 or 480 can fail, while the storage devices 411 to 413 and 461 to 463 remain accessible to the respective other the motherboard 430 or 480.

To ensure data integrity on the shared storage devices, each computer system 400 and 450 may need to ensure exclusive access to the data on the storage devices. Embodiments of the present invention can provide exclusive data access at different granularities.

One embodiment may provide mutually exclusive access on a RAID set granularity.

A second embodiment may provide mutually exclusive access on data storage device granularity.

A third embodiment may provide mutually exclusive access on a sub-granularity of the data storage device, such as records or extents.

Embodiments of the present invention may use different mechanisms to provide mutually exclusive access. The embodiments may tag each data set with attributes that indicate their access state to help serializing concurrent accesses. Such tags may be based on standardized mechanisms, such as so-called persistent reservations, or custom engineered mechanisms, such as flags associated with the data.

One embodiment may ensure mutually exclusive access by using mechanisms contained in the data storage devices.

A second embodiment may ensure mutually exclusive access by using the software operating the data storage devices.

A third embodiment may ensure mutually exclusive access by using the storage controller accessing the data storage devices.

A plurality of mutual exclusive access granularities may co-exist in the same computer system, for instance, for different data sets. Such a computer system can implement a mechanism to ensure mutually exclusive access, methods for determining one or more granularities, and perform such determining manually or automatically.

The access granularities may be user specified. The user may access, configure or modify modes associated with the plurality of access granularities via a graphical user interface (GUI), a command-line interface (CLI), or other such user interfaces, locally or remotely.

The process of automatically determining the access granularities may include examining a plurality of operating conditions, such as properties of the data sets, storage devices and computer systems, and adaptively arranging the data sets in corresponding access granularities.

Serial Attached SCSI (SAS) is a data storage device interface and interconnect technology that is currently very popular. With SAS, for instance, each storage device 411 is a SAS storage device with two connectors 411a and 411b that connect to two corresponding SAS ports 421a and 421b on backplane 420. Each switch 423a and 423b is a SAS switching chip, the storage device controller 431 is a SAS controller or a SAS HW RAID controller, the external storage connectors 401a and 401b are SAS connectors, the storage connections 490a and 490b are provided by SAS cables, and the computer systems 400 and 450 electrically share their SAS storage devices.

Figure 2:
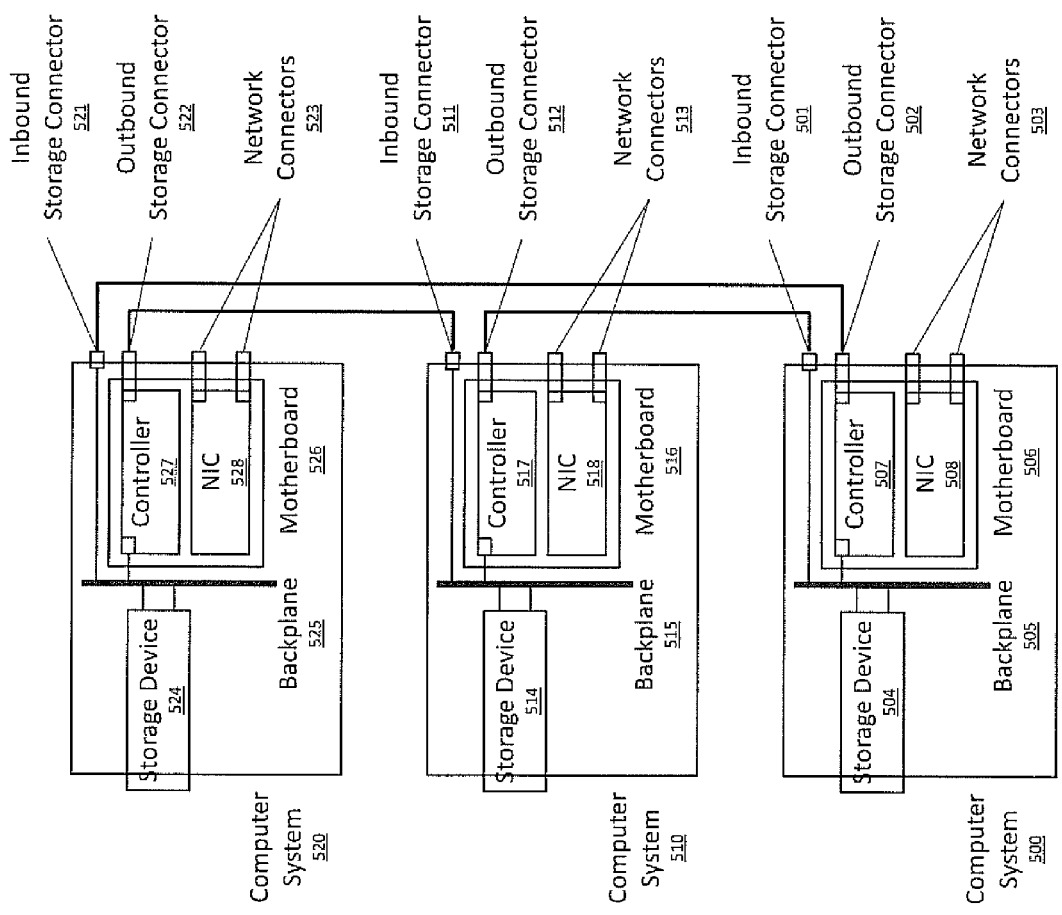
FIG. 2 shows a block diagram of an exemplary arrangement of computer systems in a daisy chained topology, so that each two of them can share their storage devices with each other respectively.

FIG. 2 shows a block diagram of an exemplary configuration of three or more computer systems. FIG. 2 shows "daisy chaining" of computer systems 500, 510 and 520, which allows each computer system to share its storage devices with two other computer systems, respectively.

For instance, computer system 500 shares its storage devices 504 with computer system 510 via inbound storage connector 501, and can access the storage devices 524 of computer system 520 via outbound storage connector 502.

For instance, computer system 510 shares its storage devices 514 with computer system 520 via inbound storage connector 511, and can access the storage devices 504 of computer system 500 via outbound storage connector 512.

Thus, one of each motherboards 506, 516 or 526 (or a component thereof) can fail, while the storage devices 504, 514 and 524 remain accessible to the respective other motherboards.

Figure 3:
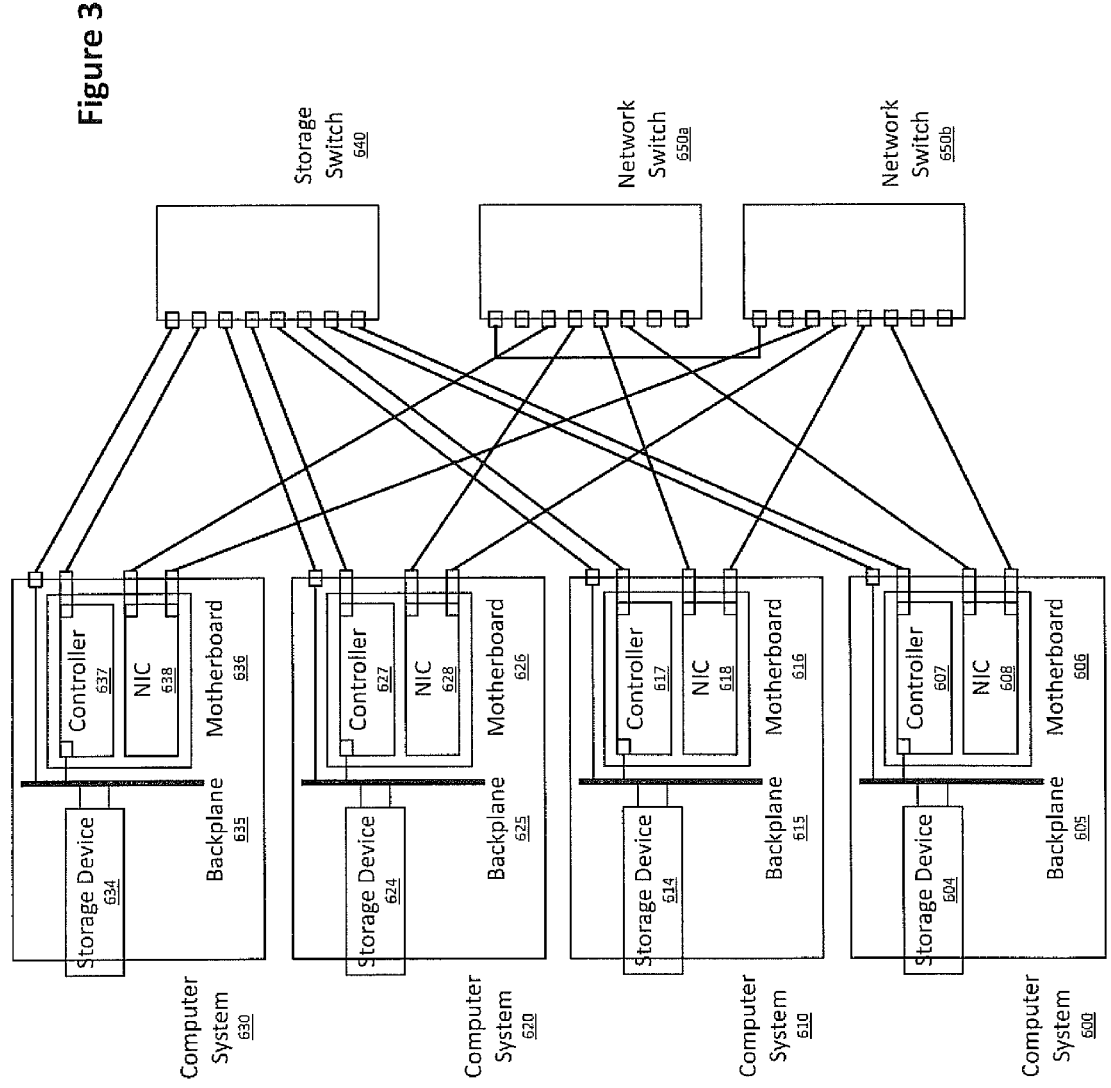
FIG. 3 shows a block diagram of an exemplary arrangement of computer systems using a storage switch device 640, so that the computer systems can share their storage devices with each other.

FIG. 3 shows a block diagram of another exemplary configuration of three or more computer systems. FIG. 3 shows connecting computer systems 600, 610, 620 and 630, through a storage switch device 640, which allows the computer systems to share their storage devices with the other computer systems.

For instance, the computer system 600 shares its storage devices 604 with the other computer systems 610, 620 and 630 via storage switch device 640, and can access the storage devices 614, 624 and 634 of other those computer systems 610, 620 and 630.

Thus, all but one of the motherboards 606, 616, 626 and 636 (or a component thereon) can fail, while the storage devices 604, 614, 624 and 634 remain accessible to remaining the other motherboards.

The storage switch device 640 can also fail, and the storage devices 604, 614, 624 and 634 remain accessible to the motherboards 606, 616, 626 and 636, albeit the motherboards may fall back to accessing external storage devices through Network RAID, or a similar such mechanism that may involve a NIC 608, 618, 628 or 638 contained on the motherboard, the network switch 650a or 650b, and one of the NICs contained in the computer system that contains the storage devices.

Figure 4:
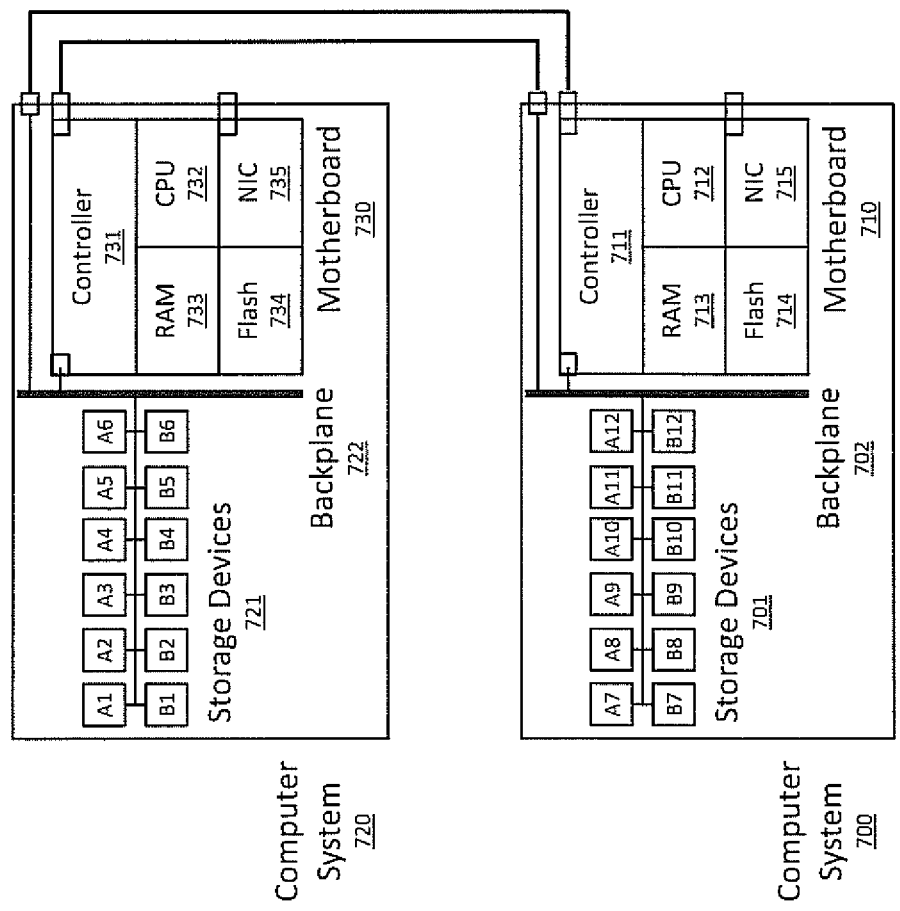
FIG. 4 shows a block diagram of two exemplary computer systems and shared storage devices, indicating how shared data can be spread across the computer systems.

FIG. 4 illustrates an example data layout. Although a specific data layout is disclosed in computer systems 700 and 720, it should be appreciated that such layouts are examples. That is, embodiments of the present invention may have various other layouts or variations of the data depicted in computer systems 700 and 720. It is further appreciated that the components in computer systems 700 and 720 may operate with other components than those presented, and that not all of the components of the computer systems 700 to 720 may be required to achieve the goals of the overall configuration.

In one embodiment of the present invention, two computer systems 700 and 720 share two distributed data sets, which may be RAID sets, the first RAID set formed by storage devices 721 A1 to A6 and storage devices 701 A7 to A12, and the second RAID set formed by storage devices 721 B1 to B6 and storage devices 701 B7 to B12.

In a second embodiment, the data may be redundantly dispersed among the computer systems 700 and 720 by expressing it in over-defined polynomial equations, such as erasure codes, RAID encodings, or other such functions.

As described in FIG. 1 before, if a motherboard 710 (or a component thereon) in the first computer system 700 fails, the storage devices 701 contained in the first computer system 700 remain accessible to the second computer system 720.

The data layout may be configured via a graphical user interface (GUI), a command line interface (CLI), or other such user interfaces. A user may access or configure each respective data layout across the computer systems 700 and 720, or modify recommended data layouts using the GUI, CLI or other user interface.

The manager software may automatically determine data layouts for different data domains based on a plurality of operating conditions, such as data usage patterns. For instance, a frequently accessed data section may be laid out optimized for speed over space, while less frequently accessed data may be laid out optimized for space over speed.

Figure 5:
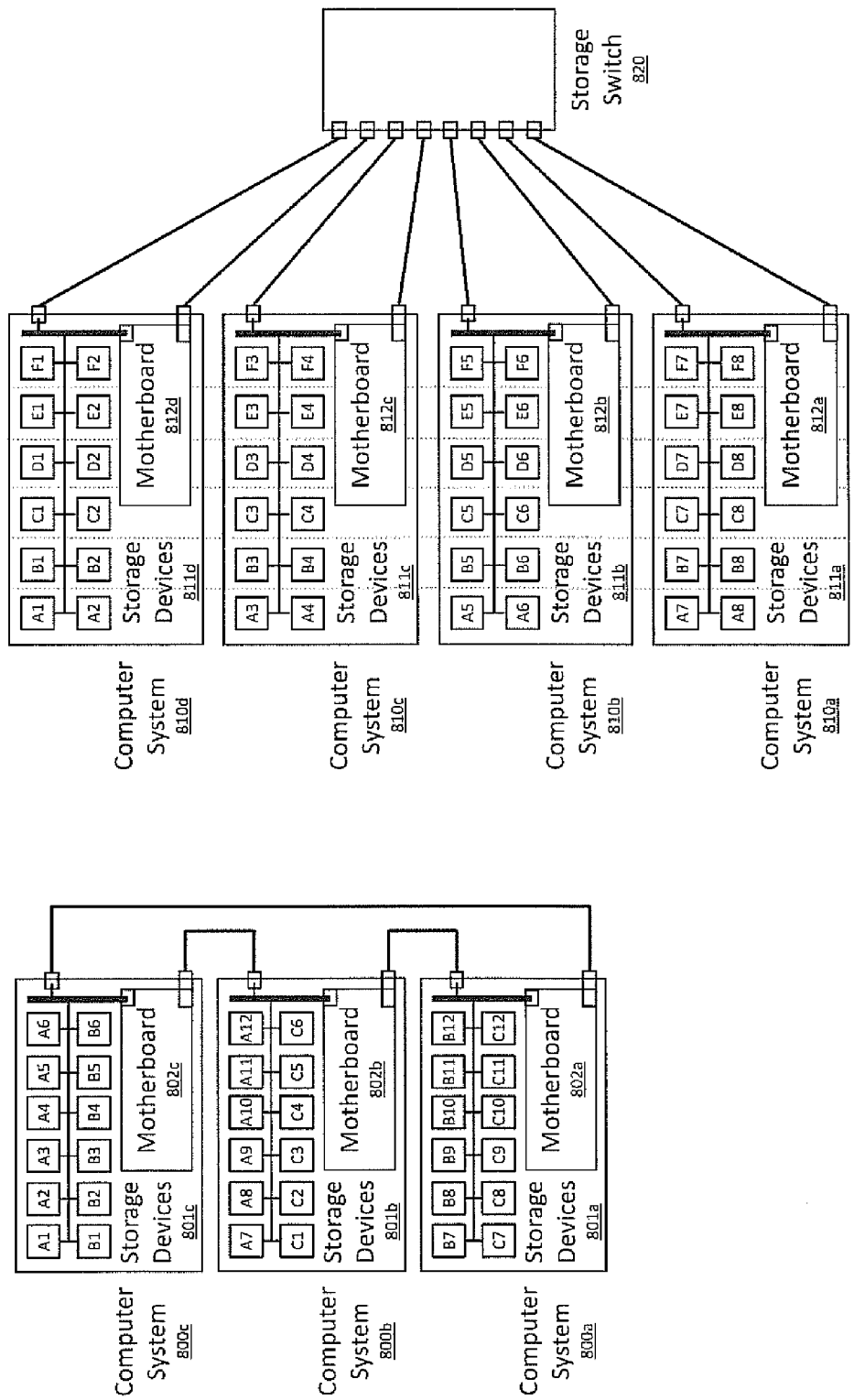
FIG. 5 shows block diagrams of two topologies and corresponding data layouts across shared storage devices, indicating how data can be shared among the computer systems containing the storage devices.

FIGS. 5a and 5b show more data layout examples. Although specific data layouts are disclosed in FIG. 5a, computer systems 800, and in FIG. 5b, computer systems 810, it should be appreciated that such layouts are examples. That is, embodiments of the present invention may have various data layouts or variations thereof other than depicted in FIG. 5a and FIG. 5b. It is appreciated that the components in computer systems 800 to 810 may operate with other components than those presented, and that not all of the components of systems 800 to 710 may be required to achieve the goals of the overall configuration.

FIG. 5a illustrates one embodiment of the present invention, in which three computer systems 800 share three distributed data sets, such as RAID sets, the first one formed by storage devices 801c A1 to A6 and storage devices 801b A7 A12, the second one formed by storage devices 801c B1 to B6 and storage devices 801a B7 to B12, and the third one formed by storage devices 801b C1 to C6 and storage devices 801a C7 to C12.

In each computer system 800, each storage device 801 is connected to two motherboards 802 (all components thereon, including the controllers, are omitted for brevity), the first such connection being internal to its associated computer system 800, and the second one being external and not going through a motherboard 802 contained in its associated computer system 800.

As described in FIG. 2 before, if a motherboard 802 (or a component thereon) in a computer systems 800 fails, the storage devices 801 contained in the computer system remain accessible to the respective other computer systems 800.

FIG. 5b illustrates another example data layout. In this embodiment, four computer systems 800a to 800d share their storage devices 811, which contain six distributed data sets, such as RAID sets or polynomial equation sets (for instance, erasure codes), Ax to Fx, indicated by the dotted lines separating them, the first data set formed by the storage devices 811 A1 to A8, the second data set formed by the storage devices 811 B1 to B8, the third data set formed by the storage devices 811 C1 to C8, and so on.

In each computer system 810, each storage device 811 is connected to two motherboards 812 (all components thereon, including the controllers, are omitted for brevity), the first such connection being internal to its associated computer system 810, and the second one being external, not traversing through a motherboard 812 contained in its associated computer system. In an alternate embodiment, it may traverse through a motherboard 812 contained in its associated computer system.

As described in FIG. 3 before, if a motherboard 812 (or a component thereon) in a computer systems 810 fails, the storage devices 811 remain accessible to the other computer systems 810.

As described in FIG. 3 before, if the storage switch device 820 fails, the storage devices 811 remain accessible to the computer systems 810, albeit the computer systems may need to fall back to accessing their external storage devices 811 via a NIC contained in them, and a corresponding computer network (which are omitted in FIG. 5b for brevity) that provides connectivity among the computer systems 810, similar to Network RAID.

In one embodiment, if the storage devices are configured to use a double-redundancy layout, such as provided by RAID6, then even if one of the computer systems 800 or 810 fails entirely, the data contained on the storage devices 801 and 811, respectively, is still accessible.

In other embodiments, this configuration can be expanded by adding more computer systems 800 or 810 that contain a number of storage devices that is at least as large as the number of redundancy sets. In that case, each of the redundancy sets that stretch across participating computer systems 800 or 810 expands by the additional storage device(s). Thereby, the net capacity efficiency of each redundancy set also increases.

As computer systems 800 or 810 are added or removed from such a configuration, processes run on one or more computer systems in the configuration correspondingly expand, shrink or rebalance the data redundancy sets that are associated with such computer systems.

Figure 6:
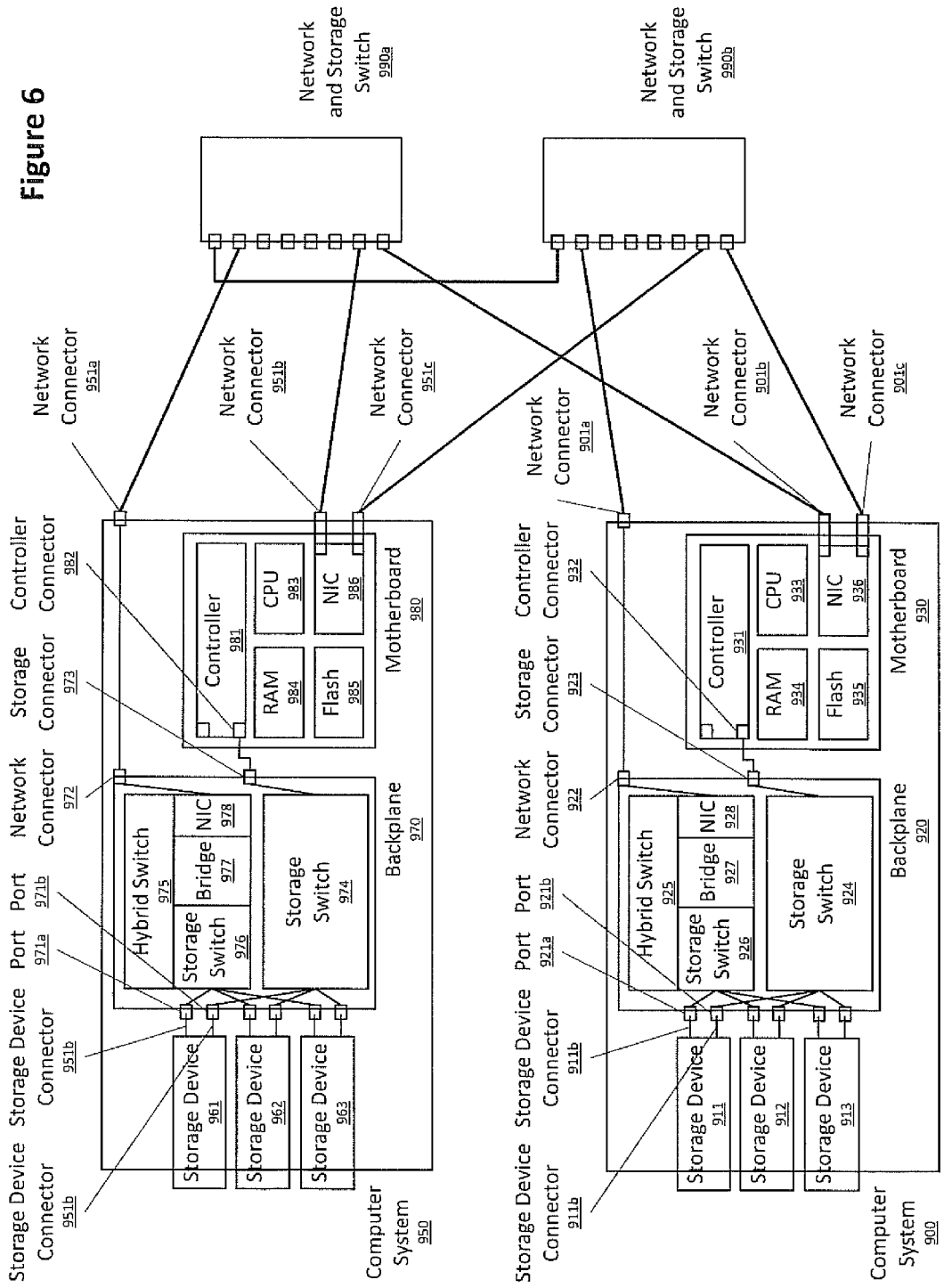
FIG. 6 shows a block diagram of two exemplary computer systems that share their storage devices over one or more network connections.

FIG. 6 shows a block diagram of two exemplary computer systems 900 and 950 sharing their storage devices 911 to 913 and 961 to 963, respectively, with each other. It is appreciated that the components in computer systems 900 and 950 may operate with other components than those presented, and that, for example, not all of the components of backplanes 920 and 970, or motherboards 930 and 980 may be required to achieve the goals of the overall configuration.

The storage devices 911 to 913 and 961 to 963 can be any number, form or combination of non-volatile data storage devices, including hard disk storage devices (HDDs), solid state storage devices (SSDs), hybrid storage devices, independently powered volatile data storage including battery backed-up RAM, tapes, a combination thereof, or other such non-volatile data storage devices.

The flash memories 935 and 985 can be any number, form or combination of non-volatile solid state data storage devices, including battery-backed RAM, flash memory, phase change memory (PCM), hybrid solid state memory devices, a combination thereof, or other such non-volatile data storage devices.

The NICs 928 and 978 may be a different type of NICs with a different design than the NICs 936 and 956.

In computer system 900, the storage devices 911 to 913 are connected to the backplane 920.

The backplane 920 contains a first storage switch 924, connecting the storage devices to an internal storage device controller 931 contained on a motherboard 930, along with the other typical components of a computer system, including one or more CPUs 933, RAM 934, other non-volatile storage devices, such as flash memory 935 or other such non-volatile memory technologies, and mechanisms to provide access to a computer network, such as a NIC 936.

The backplane 920 further contains a second hybrid switch 925 to provide external access to the storage devices 911 to 913 from outside of the computer system 900.

The hybrid switch 925 contains a storage switch 926 connecting to the storage devices 911 to 913, a bridge 927 connecting the storage switch 926 to a NIC 928, and the NIC 928 connecting to a computer network via an external network connector 901*a*.

Storage switches provide physical access control by connecting computer systems to only those storage devices that the computer systems are authorized to access. If the network switches 990 used to access the storage devices are Ethernet, or other switches, coupled to a larger network, similar access control measures may need to be established, for instance by configuring VLANs or similar techniques on the network switches and NICs to segregate network access domains appropriately.

The second computer system 950 mirrors the configuration of the first computer system 900.

Thus, the first computer system 900 can access the storage devices 961 to 963 contained the second computer system 950 like its own storage devices, via its NIC 936 over a computer network, optionally containing one or more switches 990*a* and 990*b*, and vice versa.

Thus both computer systems share the storage devices over a computer network. In one embodiment, the computer network may be Ethernet, or in a second embodiment, the computer network may be InfiniBand.

Thus, one of each motherboards (or a component thereon) 930 or 980 can fail, while the storage devices 911 to 913 and 961 to 963 remain accessible to other computer systems.

To ensure data integrity for the shared storage devices, each computer system may need to ensure mutually exclusive access to the data on the storage devices. Embodiments of the present invention can provide exclusive data access at different granularities, as described in FIG. 1.

Figure 7:
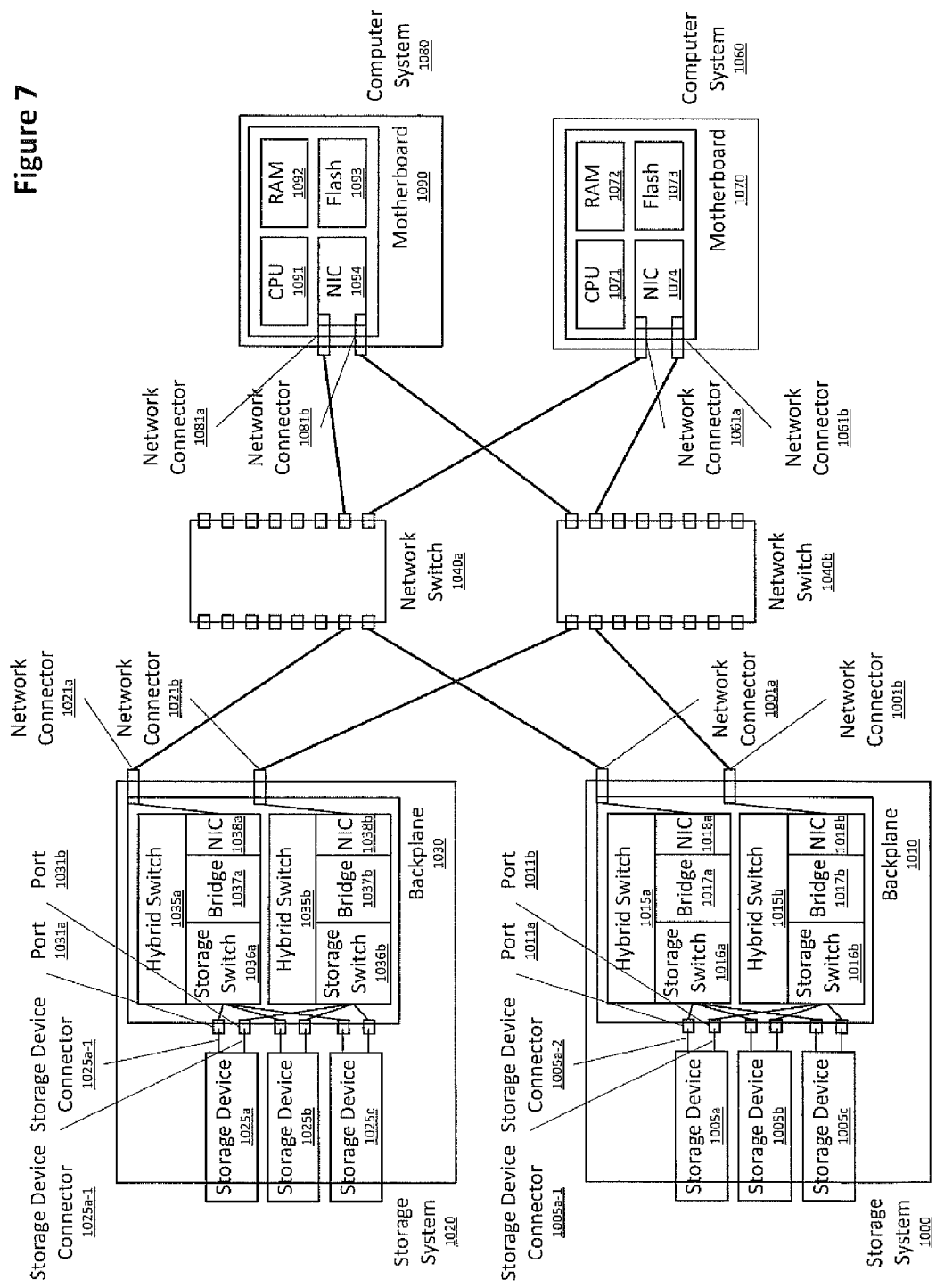
FIG. 7 shows a block diagram of two exemplary storage systems containing storage devices, and two computer systems that share the storage systems over one or more network connections.

FIG. 7 shows a block diagram of two exemplary storage systems 1000 and 1020 shared by two exemplary computer systems 1060 and 1080. It is appreciated that the components in the storage systems 1000 and 1020, and in the computer systems 1060 and 1080, may operate with other components than those presented, and that, for example, not all of the components of backplanes 1010 and 1030, or motherboards 1070 and 1090 may be required to achieve the goals of the overall configuration.

It is further appreciated that the storage devices 1005 contained in the storage system 1000, and the storage devices 1025 contained in the storage system 1020, can be any number, form or combination of non-volatile data storage devices, including hard disk storage devices (HDDs), solid state storage devices (SSDs), hybrid storage devices, independently powered volatile data storage including battery backed-up RAM, tapes, a combination thereof, or other such non-volatile data storage devices.

The storage devices 1005 in storage system 1000 are connected to a backplane 1010 also contained in the storage system 1000.

The backplane 1010 contains two or more hybrid switches 1015 to provide access to the storage devices 1005 from outside of the storage system 1000 via external connectors 1001 to a computer network.

The hybrid switches 1015 contain, respectively, a storage switch 1016 connecting to the storage devices 1005, a bridge 1017 connecting the storage switch 2016 to a NIC 1018, and the NIC 1018 connecting to a computer network via an external network connector 1001.

A second storage system 1020 and other such storage systems mirror the configuration of the first storage system 1000.

The computer system 1060 contains one or more motherboards 1070 that contain the typical components of a computer system, including a central processing units (CPU) 1071, random access memory (RAM) 1072, non-volatile storage devices, such as flash memory 1073 or other such non-volatile memory technologies, and mechanisms to provide access to a computer network, such as a NIC 1074.

The flash memory can be any number, form or combination of non-volatile solid state data storage devices, including battery-backed RAM, flash memory, phase change memory (PCM), hybrid solid state memory devices, a combination thereof, or other such non-volatile data storage devices.

The NICs 1018 and 1038 may be a different type of NICs with a different design than the NICs 1074 and 1094.

A second computer system 1080 and other such storage systems mirror the configuration of the first computer system 1060.

Thus, the computer systems 1060 and 1080 can access the storage devices 1005 and 1025 contained in storage systems 1000 and 1020.

Thus, a hybrid switch 1015 or 1035, a network switch 1040 or a computer system 1060 or 1080 (or a component therein) can fail, while the storage devices 1005 and 1025 remain accessible.

Moreover, if a redundant data layout scheme is employed, redundancy schemes such as described in FIG. 4 and FIGS. 5*a* and 5*b* facilitate continued availability of the data on the storage devices in the presence of failures thereof.

As the network switches 1040 used to access the storage devices may be Ethernet, or other switches, coupled to a larger network, access control measures may need to be established. One embodiment can provide such access control by configuring VLANs or similar techniques on the network switches and NICs to segregate network access domains appropriately.

To ensure data integrity for the shared storage devices 1005 and 1025, each computer system 1060 and 1080 may need to ensure mutually exclusive access to the data on the storage devices. Embodiments of the present invention can provide exclusive data access at different granularities, as described in FIG. 1.

Figure 8:
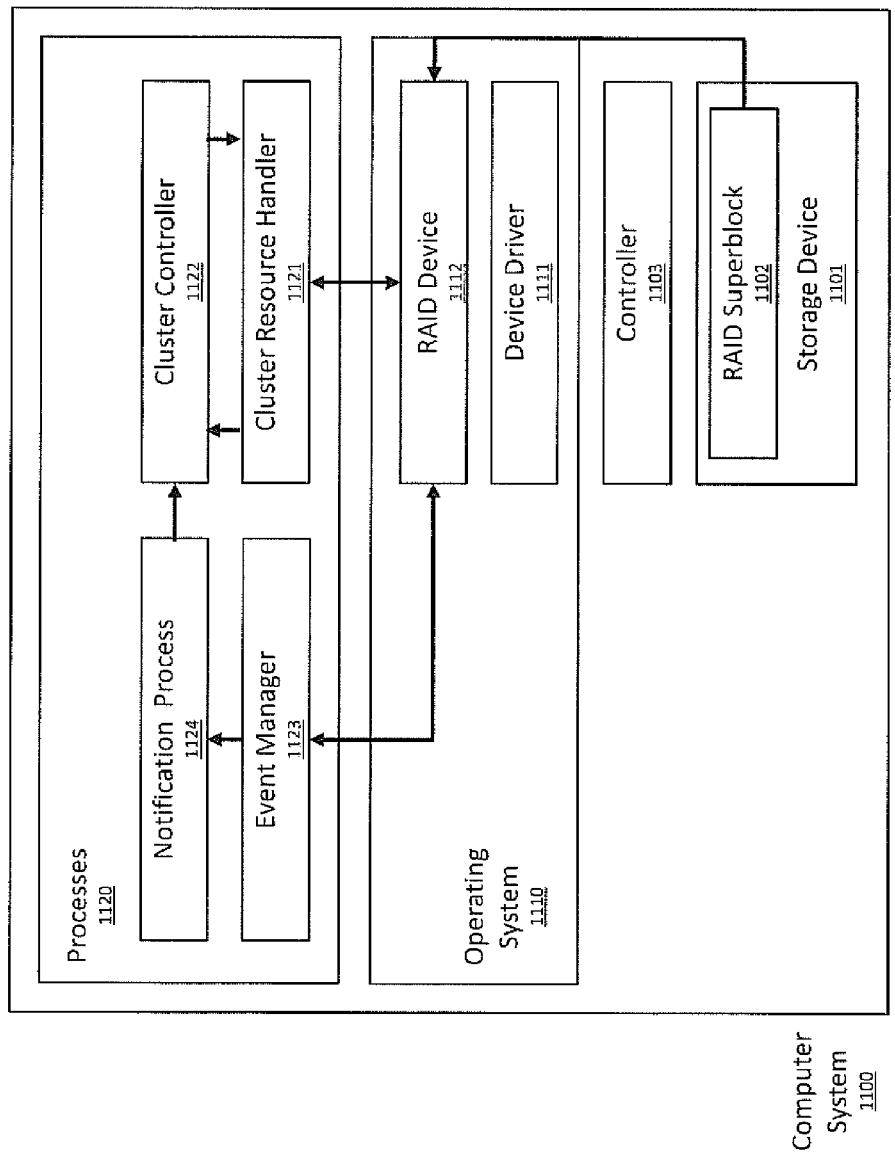
FIG. 8 shows a block diagram of an exemplary computer system containing a storage device and a controller, an operating system process or other process forming two or more storage devices into a RAID device, and an operating system process or other process providing mutually exclusive access to the RAID device.

FIG. 8 shows a block diagram of an exemplary computer system 1100. The computer system 1100 may include, but is not limited to, servers, desktop computers, laptops, tablet PCs, mobile devices, and smartphones. The computer system 1100 typically contains a number of devices, including a controller 1102 connecting to a storage device 1101 as described in FIG. 1, and runs an operating system 1110 and processes 1120.

The processes 1120 my run on the operating system 1110, for instance as a daemon, program or application, or the processes 1120 may run in the operating system 1110 as a part of the operating system 1110, or a combination thereof.

The storage device 1101 may further contain a RAID superblock 1102 identifying its membership in a RAID device 1112.

To interact with the controller 1102, the operating system 1110 may contain a software device driver 1111.

The RAID device 1112 may disperse the data over two or more storage devices 1101. The RAID device may encode the data in over-defined polynomial equations, such as erasure codes, RAID encodings, or other such functions or algorithms. The RAID device 1112 may be implemented in a software module running in the operating system 1110, as illustrated in FIG. 8. For instance, in the Linux operating system, the md-raid module implements software RAID devices, providing various RAID data layouts including RAID0 to RAID6 and combinations thereof.

The processes 1120 may contain a cluster controller 1122 to form a cluster comprising two or more computer systems, and a cluster resource handler 1121 to manage specific resources or devices in such a cluster, such as the RAID device 1112.

The event manager 1123 may be a generic device manager that listens to events from devices, such as the RAID devices 1112. For instance, in the Linux operating system, the event manager 1123 may run as a daemon and listen to events Linux sends out if a new device is initialized or a device is removed from the system. The event manager 1123 may provide a set of rules that match against exported values of the event and properties of the discovered device.

A notification process 1124 may process the events from the event manager 1123 and execute corresponding actions in the cluster.

FIG. 9 shows a flow diagram of an exemplary mechanism to provide mutually exclusive access to storage devices. Although a specific embodiment is disclosed in FIG. 9, it should be appreciated that such embodiments are examples. That is, embodiments of the present invention may have various implementations or variations thereof other than depicted in FIG. 9. It is appreciated that the implementation may operate with other components than those presented, and that not all of the steps described in FIG. 9 may be required to achieve the goals of the overall system.

At block 1211, each storage device is discovered, before its associated RAID superblock is read out at block 1212 in order to identify the RAID device of which it is part of.

At block 1213, the subsequent start of the RAID device is skipped to first query the cluster resource handler at block 1214, and determining whether the RAID device is already part of a cluster resource at block 1215.

If the RAID is not already part of a cluster resource, then at block 1216, a corresponding cluster resource is created with the RAID device before proceeding to block 1218.

If the RAID device is already part of a cluster resource, then at block 1217 it is determined whether the corresponding RAID device has been started.

If the RAID device has been started, it is proceeded to block 1219, otherwise to block 1218.

At block 1218, the RAID device is locked and started before proceeding to block 1219.

At block 1219, the RAID device is ready to be used with ensured mutually exclusive access from computer systems.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:
1. A system comprising:
   a first computer system comprising:
      a first enclosure serving as an exterior housing of the first computer system;
      a first set of storage devices comprising one or more storage devices;

a first backplane comprising a first set of switches comprising one or more switches, wherein the first set of switches are coupled to the first set of storage devices;
a first motherboard comprising a single first controller coupled to the first set of storage devices; and
a second computer system operable to be communicatively coupled to said first computer system and wherein said second computer system comprises:
a second enclosure serving as an exterior housing of the second computer system;
a second set of storage devices comprising one or more storage devices;
a second backplane comprising a second set of switches comprising one or more switches, wherein the second set of switches are coupled to the second set of storage devices; and
a second motherboard comprising a single second controller coupled to the second set of storage devices, and
wherein a switch in the second set of switches is configured to allow the single first controller to access the second set of storage devices responsive to a failure of the second motherboard.

2. The system of claim 1, wherein the first enclosure is a first chassis and the second enclosure is a second chassis.

3. The system of claim 1, wherein at least one of the first set of storage devices comprises two connections to the first backplane, the two connections operable to allow communication to one of the single first controller and the single second controller via the first set of switches.

4. The system of claim 1, wherein the single first controller is communicatively coupled to at least one of the second set of storage devices.

5. The system of claim 1, wherein the second set of storage devices are disposed external to the first enclosure of the first computer system.

6. The system of claim 1, wherein the single first controller resides on the first motherboard and wherein the first motherboard comprises a memory, a central processing unit (CPU), and a network interface controller (NIC).

7. A system comprising:
a first computer system comprising:
a first enclosure serving as an exterior housing of the first computer system:
first storage devices;
a first backplane comprising first switches, wherein the first switches are coupled to the first storage devices;
a first motherboard comprising a first controller coupled to the first storage devices;
a first inbound connection coupled to at least one switch of the first switches; and
a first outbound connection coupled to the first controller, wherein the first inbound connection is configured to allow remote access of the first storage devices by a second computer system, and wherein the first outbound connection is configured to allow the first controller to access second storage devices external to the first enclosure and located in the second computer system; and
said second computer system comprising:
a second enclosure serving as an exterior housing of the second computer system
the second storage devices;
a second backplane comprising second switches, wherein the second switches are coupled to the second storage devices; and
a second motherboard comprising a second controller coupled to the second storage devices;
a second inbound connection coupled to at least one switch of the second switches; and
a second outbound connection coupled to the second controller, wherein the second inbound connection is configured to allow remote access of the second storage devices by the first computer system, and wherein the second outbound connection is configured to allow the second controller to access the first storage devices,
wherein the first controller of the first computer system s configured to access the second storage devices responsive to a failure of the second motherboard.

8. The system apparatus of claim 7, wherein the first enclosure is a first chassis and the second enclosure is a second chassis.

9. The system of claim 7, wherein at least one of the first storage devices comprises two connections to the first backplane.

10. The system of claim 7, wherein the first controller is communicatively coupled to the second storage devices.

11. The system of claim 7, wherein at least one of the second switches of the second computer system is configured to allow the first controller of the first computer system to access the second storage devices.

12. The system of claim 7, wherein the second storage devices of the second computer system are external to the first enclosure of the first computer system.

13. The system of claim 7, wherein the first controller resides on the first motherboard.

14. A computer system comprising:
a first computer system comprising:
a first enclosure serving as an exterior housing of the first computer system;
a first set of storage devices comprising one or more storage devices;
a first backplane comprising a first set of switches comprising one or more switches, wherein the first set of switches are coupled to the first set of storage devices;
a first motherboard comprising a first controller coupled to the first set of storage devices;
a first inbound connection coupled to at least one switch of the first set of switches; and
a first outbound connection coupled to the first controller, wherein the first inbound connection is configured to allow remote access of the first set of storage devices, and wherein the first outbound connection is configured to allow the first controller to access a storage device external to the first enclosure and residing in a second computer system responsive to failure of a second motherboard residing in the second computer system and coupled to the storage device.

15. The computer system of claim 14, wherein the first controller comprises a single controller.

16. The computer system of claim 14, wherein the first controller is configured to access one or more storage devices of an external computer system.

17. The computer system of claim 16, further comprising the second computer system, wherein the second computer system comprises:
a second enclosure;
a second set of storage devices comprising one or more storage devices;

a second backplane comprising a second set of switches comprising one or more switches, wherein the second set of switches are coupled to the second set of storage devices of the second computer system;

the second motherboard comprising a second controller coupled to the second set of storage devices of the second computer system;

a second inbound connection coupled to at least one switch of the second set of switches; and a second outbound connection coupled to the second controller, wherein the second inbound connection is configured to allow remote access of the second set of storage devices, and wherein the second outbound connection is configured to allow the second controller to access the first set of storage devices external to the second enclosure.

18. The computer system of claim 17, wherein the first enclosure is a first chassis and the second enclosure is a second chassis.

19. The computer system of claim 17, wherein at least one of the second set of switches is configured to allow the first controller to access the second set of storage devices responsive to failure of the second motherboard.

\* \* \* \* \*